United States Patent Office 2,861,179
Patented Nov. 18, 1958

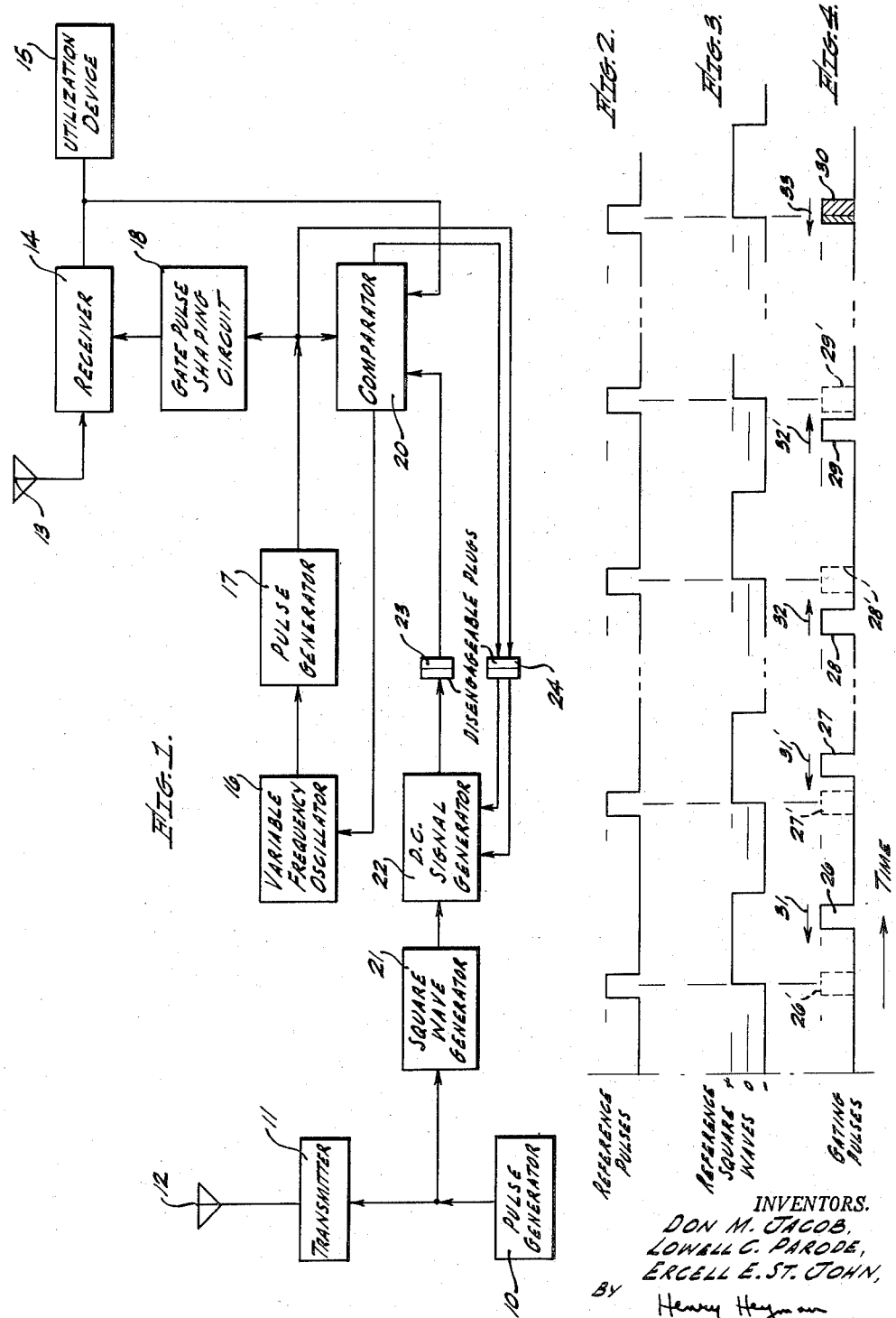

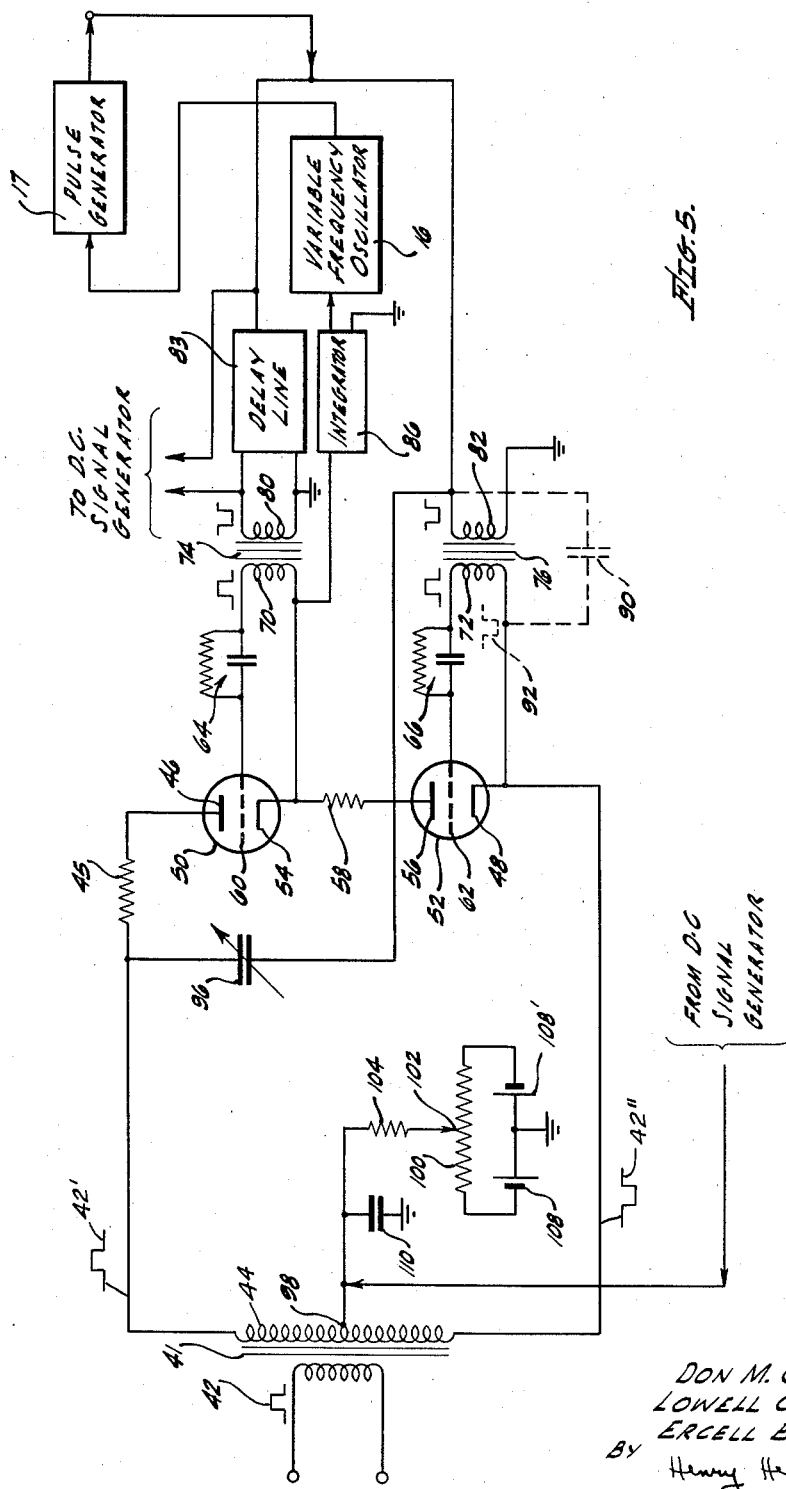

2,861,179

SYSTEM FOR ESTABLISHING INITIAL OPERATION OF PULSE RECEIVER

Don M. Jacob, Los Angeles, Lowell C. Parode, Manhattan Beach, and Ercell E. St. John, Hawthorne, Calif., assignors to Hughes Aircraft Company, Culver City, Calif., a corporation of Delaware Application April 2, 1954, Serial No. 420,538

3 Claims. (Cl. 250—20)

This invention relates to pulse transmitter-receiver systems of the type employing a self-gated receiver and a transmitter which are originally at the same location but are subsequently to be separated abruptly, and more particularly to apparatus for automatically initiating self-gating operation of the receiver prior to its being separated from the transmitter.

Transmitter-receiver arrangements which are to be separated are employed in certain remote control and telemetering applications. The transmitted signals may consist of modulated pulses which have a nominally constant repetition rate. To discriminate against interference, the receiver is gated, i. e., it is arranged to be operative substantially only when the desired pulses are received and to be made inoperative during the intervals between the pulses.

Control of the receiver gating by the received pulses, whereby reasonable variations of the repetition rate of the received pulses are compensated automatically by the receiver gating means, is termed self-gating. To obtain proper self-gating of the receiver requires that the gating means be initially synchronized with the received pulses. Initial adjustment of the gating means may be made manually; however, this procedure requires a certain amount of time and introduces the possibility of human errors. Delay in attempting to correct such errors may occur where loss of time cannot be tolerated.

In accordance with this invention, a desired initial operation of a self-gated pulse receiver is provided automatically by means of reference pulses, derived from the transmitter, which coincide with the received signal pulses while the transmitter and receiver are together. Square waves are developed whose leading edges coincide with the reference pulses. Gating pulses for operating the receiver are compared with the square wave, and a D.-C. signal is developed which represents the positions of the gating pulses with respect to the leading edges of the square wave. Error signals, which depend on the magnitude and polarity of the D. C. signal are developed and utilized for centering the gating pulses about the leading edges of the square wave.

It is, therefore, an object of this invention to provide an electronic control system for automatically establishing a desired initial operation of a self-gated pulse receiver.

It is another object of this invention to provide, for a self-gated receiver employed in a pulse transmit-receive system which normally operates during relative movement between the transmitter and receiver portions of the system, a control system for obtaining initial lock-on operation for gating of the receiver in synchronism with the received signal pulses.

It is a further object of this invention to provide electronic means for automatically establishing initial synchronous operation of a self-gated pulse receiver with received signals, whereby proper operation of such receiver is instantly achieved automatically and without manual adjustment, thereby eliminating the possibility of human errors.

This invention, both as to its organization and method of operation, together with further objects and advantages believed to be characteristic thereof, will be better understood from the following description considered in connection with the accompanying drawings, in which a preferred embodiment of the invention is illustrated by way of example, and its scope is pointed out in the appended claims. Referring to the drawings:

Fig. 1 is a block diagram of a pulse transmit-receive system employing a control system for effecting a desired initial operation of the receiver, in accordance with this invention;

Figs. 2–4 are idealized waveforms which illustrate the operation of various parts of the control system of Fig. 1 and portions of the receiver controlled thereby; and Fig. 5 is a schematic diagram of a signal-comparing circuit suitable for use in the system of Fig. 1.

Referring to Fig. 1, a pulse transmit-receive system comprises a pulse generator 10, a transmitter 11 connected to pulse generator 10, and an antenna for transmitter 11.

The receiving portion of the system includes an antenna 13 connected to receiver 14, and a utilization device 15, which may include a recorder, connected to receiver 14. A self-gating network for receiver 14 includes a variable frequency oscillator 16 which controls the output of a pulse generator 17. A gate pulse shaping circuit 18 connected to pulse generator 17 develops gating pulses of appropriate duration for operating receiver 14. A signal comparator 20 is connected to receiver 14 and to pulse generator 17, and the output of comparator 20 controls the operation of oscillator 16.

The system above described, operates normally as follows:

The pulse generator 10 may provide pulses of a constant repetition rate for operating transmitter 11, which causes antenna 12 to emit corresponding pulses of radio frequency energy. As these pulses arrive at receiver 14, the self-gating network renders the receiver operative, and the device 15 operates in response to the intelligence in the output of receiver 14. If, because of variation in the rate of change in range between the receiver and transmitter, the received signal pulses arrive at varying time intervals, comparator 20 develops an error signal to change the frequency of operation of oscillator 16 and maintain synchronous gating of the receiver with the received signal pulses.

The normal self-gating operation of receiver 14 cannot be accomplished unless subtantial time coincidence between the gating pulses and the received signal pulses has been obtained initially. Although oscillator 16 may be operating at approximately the correct frequency initially, adjustment will be required to lock-on or render the self-gating network operable in synchronism with the received pulses. Where time is of the essence, as where the transmitter and receiving portions of the system are to be abruptly separated, such adjustment must be rapid and accurate.

According to this invention, and referring to Figs. 2–4, along with Fig. 1, an automatic lock-on control system for oscillator 16 comprises the pulse generator 10, a reference signal generator 21, a D.-C. signal generator 22, and the comparator 20. Pulse generator 10 constitutes a source of reference pulses (Fig. 2), and generator 21 develops a cyclic reference signal, such as a square wave (Fig. 3), the leading edges of which coincide with the reference pulses. D.-C. generator 22 develops a D.-C. signal which represents the portion of the square wave with which the gating pulses coincide. Comparator 20 develops an error signal representative of the D.-C. signal for changing the frequency of operation of oscillator 16, thereby changing the recurrence of the gating pulses (Fig. 4), until the gating pulses are centered about the leading edges of the square wave. Once the gating pulses are centered about the leading edge of the square wave, the self-gating network is synchronized with the pulses from transmitter 10, and the voltage from D.-C. generator 22 drops to zero.

The D.-C. signal generator 22 is connected through a disengageable plug 23 to comparator 20, and connections to generator 22 from pulse generator 17 and comparator 20, to effect gating of generator 22 in the manner of comparator 20, are made through a disengageable plug 24. (Gating of comparator 20 and generator 22 will be explained hereafter.) With initial lock-on operation of oscillator 16 effected, separation of transmitter 11 and receiver 14 will break the connections through plugs 23, 24. The system will then operate in the normal manner previously described.

A better understanding of the operation of the above described control system of this invention may be had by reference to Figs. 2–4. Fig. 4 illustrates different initial positions of the gating pulses with respect to the leading edges of the square wave. The gating pulses may occur subsequent to the leading edge, as represented by pulses 26, 27; they may precede the leading edge, as shown by pulses 28, 29; they may occur in partial coincidence with the leading edge, a condition represented by a pulse 30.

The polarities of the outputs of D.-C. signal generator 22 and comparator 20 depend upon the positions of the gating pulses with respect to the leading edges of the square wave. The magnitudes of such outputs depend upon the portions of the square wave with which the gating pulses coincide. For the pairs of pulses 26, 27 and 28, 29, the error signals would be the same magnitude but opposite in polarity. The frequency of operation of oscillator 16 would be increased to accelerate pulses 26, 27, as indicated by arrows, 31, 31', and center them about the leading edges of the square wave (dotted pulses 26', 27'). The frequency of operation of the oscillator would be decreased to cause pulses 28, 29 to be moved, as indicated by arrows 32, 32', toward alignment about the leading edges (see dotted pulses 28', 29). For the gating pulse 30, the frequency of operation of oscillator 16 will be increased, as in the case of pulses 26, 27, but in response to an error signal of reduced magnitude which corresponds to the difference between the portions of pulse 30 which are on opposite sides of the leading edge of the square wave.

Fig. 5 illustrates a time discriminator and associated circuits which may be used for the comparator 20 of Fig. 1. The time discriminator of Fig. 5 is described and claimed in a copending application of J. E. Jacobs et al., entitled, "Time Discriminator," Serial No. 356,402, filed May 21, 1953, and assigned to the same assignee as is the present application. Although reference to such copending application may be made for a complete explanation of such time discriminator, the following detailed description is presented for a clearer understanding of the present invention.

Referring to Fig. 5, a transformer 41 adapted to receive input signals, as represented by a signal pulse 42, which, for example, may be pulses developed by the receiver 14 in response to the received pulses, has the terminals of its secondary winding 44 connected, respectively, through a resistor 45 to the anode 46, and directly to the cathode 48, of two grid-controlled electron tubes 50, 52. The cathode 54 of tube 50 and the anode 56 of tube 52 are connected through a resistor 58.

The control grids 60, 62 of the respective tubes 50, 52 are biased by resistor-capacitor (RC) networks 64, 66 so the tubes are normally nonconducting. The grid-cathode circuits of tubes 50, 52 further include secondary windings 70, 72 of respective transformers 74, 76. Pulses from pulse generator 17 are applied directly to the primary winding 82 of transformer 76, and to primary winding 80 through a delay line 83. Delay line 83 delays the applied pulses by the width of the undelayed pulses, whereby early gate and late gate pulses are provided which may render the tubes 50, 52 sequentially conducting.

An output utilization or load circuit 86 is connected between cathode 54 and a point of reference potential, such as ground. The load 86 represents an electronic integrator, in which case it is effectively a large capacitor which offers substantially negligible impedance to varying currents appearing at the cathode 54, i. e., cathode 54 is maintained substantially at fixed potential.

Referring to transformer 76, the negative gating pulse applied to the upper end of primary winding 82 may be transferred by interwinding capacitance 90 to the lower end of secondary winding 72. The transferred negative pulse, indicated as a dotted pulse 92, is a spurious signal applied to cathode 48 and tending to cause current to flow in tube 52. Since load 86 is equivalent to a large capacitor, the early gate pulses applied to primary winding 80, and which otherwise might tend to cause current flow in tube 50, will be passed directly to ground. Because current may flow in tube 52 in response to the spurious signal pulses 92, and since this may not be balanced out by a corresponding current flow in tube 50, circuit unbalance may tend to become intolerable. Capacitor 96 is provided to minimize such troublesome interwinding capacitance effects and prevent circuit unbalance due to the spurious signal pulses 92. How this is done will be explained in the description of the operation of the circuit.

Completed direct-current paths for the individual tubes are provided by resistive coupling between the center-tap 98 of secondary winding 44 and ground. Such coupling comprises a potentiometer resistor 100 having its sliding contact 102 connected through a resistor 104 to the center-tap 98. The terminals of resistor 100 are connected through respective batteries 108 and 108' to ground. The batteries are poled to provide potentials at the terminals of resistor 100 between which the average operating potential of output signals may be established. A by-pass capacitor 110 is connected between center-tap 98 and ground.

The circuit above described, functions as follows: signal pulses 42 applied to primary winding 41 appear across secondary winding 44 as a positive pulse 42' and negative pulse 42" which are applied, respectively, to plate 46 of tube 50 and cathode 48 of tube 52. Current will flow through each of the tubes during coincidence between signal pulses 42', 42" and the respective early and late gate pulses. By tracing the direct-current paths for the individual tubes, it will be seen that current flow through the respective tubes will be in opposite directions with respect to the cathode 54 of tube 50. Accordingly, there is a resulting net change in charge at the load 86 which represents the difference in the periods of coincidence between the signal pulses 42 and the respective early and late gate pulses.

Capacitor 96 effects the transfer of the early gate pulses to the upper end of secondary winding 44. Because the center-tap 98 is at A.-C. ground potential by virtue of the bypass capacitor 110, the transferred gating pulses will appear at the lower end of secondary winding 44 as signal pulses opposite in polarity to the spurious signal pulses 92; by proper adjustment of capacitor 96, the magnitude of the transferred pulses can be controlled so as to achieve virtual cancellation of the spurious signal pulses 92.

In the circuit above described, resistors 45, 58, have values of resistance, relative to the internal resistances of the tubes 50, 52, such that the voltage drops across the tubes are maintained sufficiently low to prevent intolerable differences in current flow, due to differences in the tube characteristics, thereby to maintain safe circuit balance.

Where the self-gating network of Fig. 1 employs the time discriminator of Fig. 2 for comparator 20, the voltage from D.-C. signal generator 22 (Fig. 1) in the system of this invention is applied directly to the center-tap 98. In this manner, the operating signal level at cathode 54 of tube 50, during the application of the early and late gates, will be raised or lowered depending upon the magnitude of the D.-C. voltage applied at center-tap 98. Integrator 86 develops an output error voltage representative of the change in such operating signal level, and this voltage changes the frequency of operation of oscillator 16 until the coinciding edges of the early and late gates coincide with the leading edge of the square wave.

A disadvantage of other systems where the reference square wave is applied directly to the center tap 98 is that the cyclic reference signal causes the charge on capacitor 110 to fluctuate, and when the coinciding edges of the early and late gates approach the leading edge of the square wave, the effect of the varying charge on capacitor 110 may result in a signal at center-tap 98 which is not truly representative of the positions of gates with respect to the leading edge. If the signal is too small, the approach to the desired condition is slowed. If the signal is too great, the corrected operation of the oscillator may cause the gates to overshoot their mark, and subsequent corrections may result in the gates swinging about the leading edge of the square wave before lock-on is finally established.

In the present invention, the D.-C. signal applied at center-tap 98 is substantially constant until the gates begin to straddle the leading edge of the square wave. The magnitude of the D.-C. signal decreases gradually after this condition is reached, and the charge on capacitor 110 reliably follows such decrease. Accordingly, the error signals for controlling oscillator 16 are accurate, and lock-on is achieved with substantially no delay.

From the foregoing explanation, it is clear that there has been described a highly effective control system for establishing a desired initial operation of a pulse receiver, wherein pulses for gating the receiver are compared with a reference signal to develop an error signal which is representative of the difference in times of occurrence of the gating pulses and one portion of the reference signal, and in which the recurrence frequency of the gating pulses is changed in response to the error signal until the desired initial operation of the receiver is achieved.

What is claimed is:

1. In a pulse transmit-receive system wherein the transmitter and receiver portions are initially at the same location but are to be separated, and wherein the receiver portion is of the type which includes pulse generating means for developing periodically recurring gating pulses; comparing means for comparing received signals with the gating pulses to develop error signals having a magnitude and polarity representative of the portion of the received signals with which the gating pulses coincide, and frequency controlling means responsive to the magnitude and polarity of the error signal for controlling the repetition rate of the gating pulses to effect self-gating of the receiver, apparatus for initially establishing synchronous gating of the receiver with the received signal pulses comprising: signal generating means at said transmitter portion for developing cyclic reference signals having a predetermined portion which coincides with the received signal pulses, and control signal developing means at said transmitter portion coupled to said signal generating means and detachably coupled to said pulse generating means for comparing said reference signals with said gating pulses and for developing a direct current control signal having a magnitude and polarity representative of that portion of said reference signal with which said gating pulses coincide, said comparing means being detachably coupled to said control signal developing means for deriving said control signal therefrom, whereby said receiver is gated in synchronism with said predetermined portion of said reference signal.

2. A system for initially synchronizing the operation of a self-tracking pulse receiver with received signal pulses comprising: a variable frequency oscillator; pulse generating means coupled to said oscillator for developing periodically recurring gating pulses having a repetition rate equal to the frequency of said oscillator; a time discriminator including an input circuit coupled to said pulse generating means for comparing the signals applied to said input circuit with said gating pulses and for developing output signals having a magnitude and polarity representative of the portion of the signals applied to said input circuit with which said gating pulses coincide; integrating means coupled to said time discriminator for deriving said output signals therefrom, said integrating means being coupled to said oscillator for controlling the frequency of oscillations of said oscillator; reference signal generating means for developing reference signals having a predetermined portion which coincides with the received signal pulses; control signal developing means coupled to said reference signal generating means and detachably coupled to said pulse generating means for comparing said reference signals with said gating pulses and for developing a direct current control signal having a magnitude and polarity representative of that portion of said reference signals with which said gating pulses coincide, the input circuit of said time discriminator being detachably coupled to said control signal developing means for deriving said control signal therefrom, whereby said receiver is initially gated in synchronism with said reference signals; and circuit means coupling the received signals to the input circuit of said time discriminator, whereby said receiver is continuously gated in synchronism with the received signal pulses after the operation of said receiver is initially synchronized with said reference signals.

3. In a pulse transmit-receive system wherein the transmitter and receiver portions are initially at the same location but are to be separated, and wherein the receiver portion is of the type which includes pulse generating means for developing periodically recurring gating pulses, comparing means for comparing received signals with the gating pulses to develop error signals having a magnitude and polarity representative of the portion of the received signals with which the gating pulses coincide, and frequency controlling means responsive to the magnitude and polarity of the error signals for controlling the repetition rate of the gating pulses to effect self-gating of the receiver, apparatus for initially establishing synchronous gating of the receiver with the received signal pulses comprising: a source of reference pulses at said transmitter having a repetition rate equal to the instantaneous repetition rate of the received signal pulses, square wave generating means at said transmitter coupled to said pulse source for developing continuously recurring square waves, the leading edges of which coincide with the reference pulses from said source, and control signal developing means at said transmitter coupled to said square wave generating means and detachably coupled to said pulse generating means for developing a direct current control signal having a magnitude and polarity representative of the difference in time of occurrence of said leading edges and said gating pulses, said comparing means being detachably coupled to said control signal developing means for deriving said control signal therefrom, whereby said receiver is gated in synchronism with said reference pulses.

References Cited in the file of this patent
UNITED STATES PATENTS

| | | |
|---|---|---|
| 2,516,356 | Tull et al. | July 25, 1950 |
| 2,577,536 | MacNichol | Dec. 4, 1951 |
| 2,677,758 | Robinson et al. | May 4, 1954 |
| 2,776,427 | Bedford | Jan. 1, 1957 |